United States Patent [19]

Read

[11] 4,397,369
[45] Aug. 9, 1983

[54] POWER DRIVE

[76] Inventor: Glenn F. Read, 6650 Orange Blossom La., Punta Gorda, Fla. 33950

[21] Appl. No.: 253,691

[22] Filed: Apr. 13, 1981

[51] Int. Cl.³ .......................... B62M 7/02; B62M 7/10
[52] U.S. Cl. ................................... 180/205; 180/223; 180/224; 474/89
[58] Field of Search ............... 180/205, 206, 207, 211, 180/212, 213, 219, 223, 224, 231; 474/88, 89

[56] References Cited

U.S. PATENT DOCUMENTS

| 666,440 | 1/1901 | Reenstierna | 180/225 |
|---|---|---|---|
| 673,336 | 4/1901 | Dickerson | 180/207 |
| 686,284 | 11/1901 | Gottschalk | 180/231 |
| 686,653 | 11/1901 | Hahn | 60/412 |
| 729,197 | 5/1903 | Mathieu | 474/89 |
| 1,094,558 | 4/1914 | Harley | 180/207 X |
| 1,097,546 | 5/1914 | Harley | 180/207 X |
| 2,331,976 | 10/1943 | Hare | 180/207 X |
| 2,468,367 | 4/1949 | Holderness | 180/230 |
| 2,560,991 | 7/1951 | Schuricht | 474/69 |
| 2,633,030 | 3/1953 | Colden | 180/207 X |
| 4,091,887 | 5/1978 | Kurata | 180/219 X |

FOREIGN PATENT DOCUMENTS

| 535184 | 4/1922 | France . | |
|---|---|---|---|
| 1493 | of 1903 | United Kingdom . | |
| 861763 | 2/1961 | United Kingdom | 180/205 |

Primary Examiner—John A. Pekar
Attorney, Agent, or Firm—Hauke & Patalidis

[57] ABSTRACT

A power drive unit for driving a utilization mechanism such as, for example, a roadwheel of a light vehicle such as a bicycle, tricycle, or quadricycle. The utilization mechanism is driven from the output shaft of a prime mover mounted through a controllable clutch and chain drive train. Preferably, the prime mover is an internal combustion engine driven chain saw from which the saw chain and chain bar have beem removed and replaced by an adapter providing a chain and belt drive from the chain saw engine output shaft to a chainwheel coupled to the utilization mechanism, for example, a bicycle conventional chainwheel such as to drive the bicycle rear wheel through the conventional multi-speed hub or multi-speed sprocket cluster, or alternatively, to drive the front wheel of a bicycle through a chainwheel coupled to the front wheel hub, the front wheel hub being preferably a multi-speed hub with internal gears.

22 Claims, 4 Drawing Figures

POWER DRIVE

BACKGROUND OF THE INVENTION

The present invention relates to power drive means in general, and more particularly to a power drive unit for transmitting motive power from the output of a prime mover such as, an internal combustion engine, an electric motor, and the like, to a mechanism utilizing such power for an individual transportation means, such as a bicycle, tricycle or quadricycle, or for driving a machine or tool requiring a source of power.

An example of practical use of the invention is as a power drive unit for bicycles, tricycles or quadricycles. Many attempts have been made in the past to provide bicycles and tricycles with a small auxiliary internal combustion engine as disclosed, for example, in British Pat. spec. No. 1,493, French Pat. No. 535,184, U.S. Pat. Nos. 686,284, 729,197, 1,097,546, 1,094,558, 2,468,367, 2,560,991, 2,633,030, or even with a liquified gas engine, as disclosed in U.S. Pat. No. 673,336 or an impact motor as disclosed in U.S. Pat. No. 686,653. Such arrangements generally require substantial modifications of the basic structure of the two-wheeled or three-wheeled vehicle, to the extent that the vehicle cannot efficiently be returned to, and used in, its original non-motorized form. Motorized bicycles and tricycles, through evolution, have led to a complete transformation of the two-wheeled and three-wheeled vehicles, as represented in modern time by the fully motorized motorcycles and "trikes". Motorcycles, in turn, have evolved back into an hybrid type of vehicle, primarily motorized but with mechanical pedal assist in the event of power failure or in occasions when the non-human power available is insufficient as, for example, during hill climbing or when riding with a strong headwind.

The only attempt known to applicant for providing a conventional bicycle or tricycle, normally pedal-driven, with auxiliary power assist consists in mounting a small internal combustion engine, or an electric motor, above a wheel, generally above the front wheel, driving the wheel through a roller mounted on the engine output shaft and controllably engageable with the wheel tire. Such an arrangement presents many inconveniences as it relies entirely on friction for transmitting power from the engine output to the tire, and causes considerable wear of the tire tread.

The present invention remedies the inconveniences and shortcomings of the prior art by providing an auxiliary power drive for conventional pedal driven bicycles, tricycles and quadricycles, requiring no modification whatsoever to the vehicle frame and conventional pedal powertrain, which is of relatively light weight, which can utilize an internal combustion engine readily available on the market for other uses and which may be returned to its original use without complication, which can be installed on a conventional bicycle, tricycle or quadricycle easily in a few minutes, and which does not interfere with the normal operation of the vehicle by pedal power.

In addition, the power train unit of the present invention has many other applications for utilizing readily available power units for uses other than the uses for which the power units have originally been designed. By utilizing the adapter plate and the power train unit of the invention as a controllably engageable and disengageable power transmitting unit between the output shaft of, for example, a conventional chain saw engine, the chain saw engine may be conveniently used to drive any device requiring a power drive, such as, for example, a personal transportation vehicle, a boat propeller, a light aircraft propeller, an electrical generator, a small concrete mixer, a machine tool, etc.

SUMMARY OF THE INVENTION

The present invention accomplishes its many objecs by providing a power train and controllable coupling mechanism mounted on an adapter plate which, by substitution for the conventional chain bar of a chain saw, renders the chain saw prime mover capable of driving any appropriate utilization mechanism. As an example of practical applications, the present invention permits to use a conventional chain saw engine, for example, mounted on a support clampable on the frame of a vehicle such as a bicycle, without modifications to the frame, for providing a power drive by replacing the chain saw and the chain saw bar of the chain saw by an adapter plate provided with a clutch and drive mechanism which is mounted on the chain saw housing in the stead of the saw bar. The clutch and drive mechanism functions as a transmission drive to an auxiliary chain-wheel mounted adjoining the bicycle conventional chainwheel. The invention permits to utilize the normal chain drive from the chainwheel to the rear wheel gear cluster or hub sprocket and permits to utilize the normal transmission drive ratio change mechanism such as provided by a derailleur or a multi-speed hub. Alternatively, the present invention permits to drive a bicycle, or a like vehicle, by its front wheel. If so desired, the present invention even permits to provide a two-wheel drive bicycle, a three-wheel drive tricycle, or a four-wheel drive quadricycle, by supplying each wheel with its own individual power drive.

These and other objects of the present invention will become apparent to those skilled in the art when the following description of the best mode contemplated for practicing the invention is read in conjunction with the accompanying drawing, showing an example of structural embodiment of the invention particularly adapted for supplying power to a bicycle or like vehicle given for illustrative purpose only, and in which like numerals refer to like or equivalent elements.

BRIEF DESCRIPTION OF THE DRAWING

FIG. 4 is a partial view similar to FIG. 3, but showing an arrangement for driving the front wheel of a bicycle.

DETAILED DESCRIPTION OF THE PREFERRED EMBODIMENT

Figure 1:
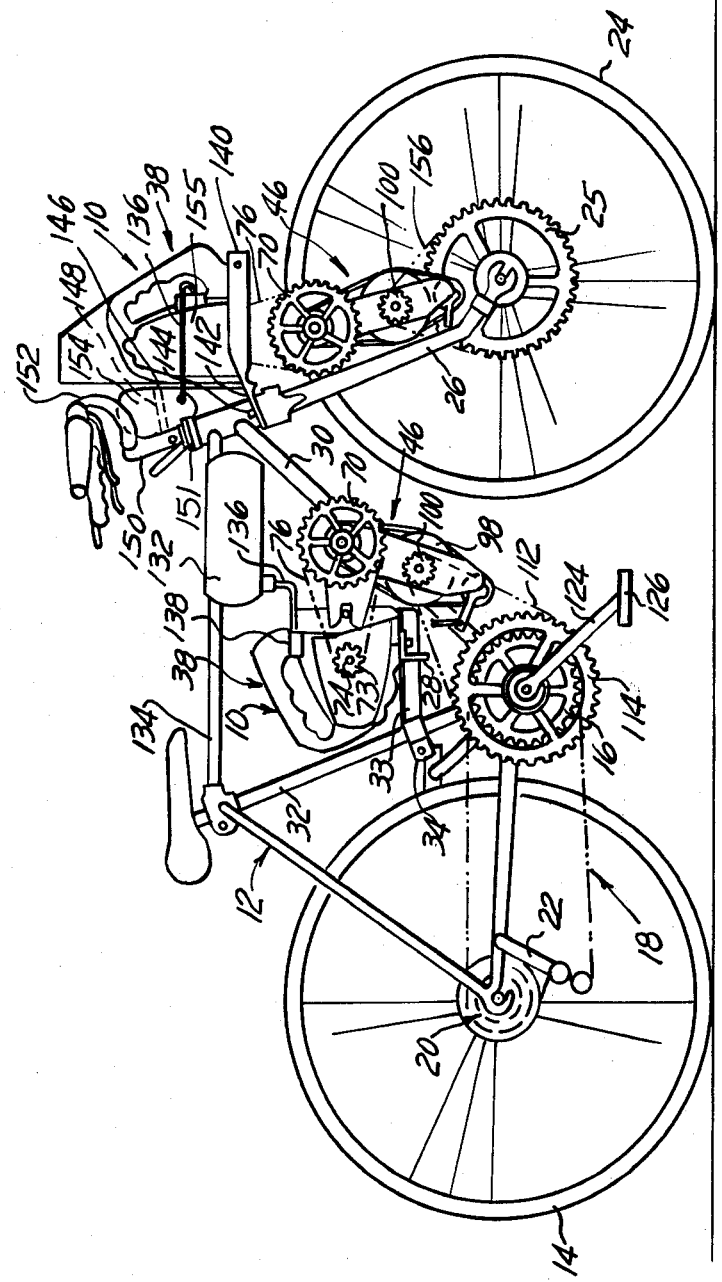
FIG. 1 illustrates a bicycle provided with examples of motorized auxiliary drives according to the invention.

As illustrated generally at FIG. 1, the invention provides a power unit, generally designated at 10, which, in the example of application illustrated herein and described in details hereinafter is used for powering a conventional bicycle 12. The power unit drives the bicycle 12 by transmitting motive power to the rear wheel 14 by means of the conventional bicycle gear train consisting of the chainwheel 16, the chain 18, and the rear wheel sprocket cluster 20, a derailleur 22 permitting to change the drive ratio by jumping the chain 18 from one sprocket to another, as is well known in the art. It will be appreciated that rather than using a derailleur 22 combined with a sprocket cluster 20, some bicycles use as a drive train a single sprocket mounted on the rear wheel, the wheel being provided with a multi-ratio hub with internal gears, such that the drive from the single sprocket to the wheel is effected at any appropriate ratio as chosen by the rider. Such an arrangement is conventional and is also well known in the art.

FIG. 1 also illustrates the manner in which the invention provides an auxiliary power drive for driving the front wheel of a bicycle or like vehicle. In such an arrangement, the auxiliary power unit 10 is mounted over the front wheel 24 and drives a relatively large diameter sprocket wheel 25 keyed to the hub of the front wheel 24, mounted in a conventional manner on the end of the steerable front fork 26. Preferably, in such front wheel drive arrangement, the sprocket wheel 25 drives the front wheel 24 through a multi-speed wheel drive hub, as will be explained hereinafter in further details.

Although the invention contemplates utilizing a single power unit 10 for driving a single wheel of a bicycle or like vehicle, and preferably a rear wheel, it is readily apparent that the invention provides an arrangement whereby any wheel or any number of wheels of a two-wheeled, three-wheeled, or four-wheeled vehicle may be power-driven, by its own engine which may be disconnected at will.

Figure 2:
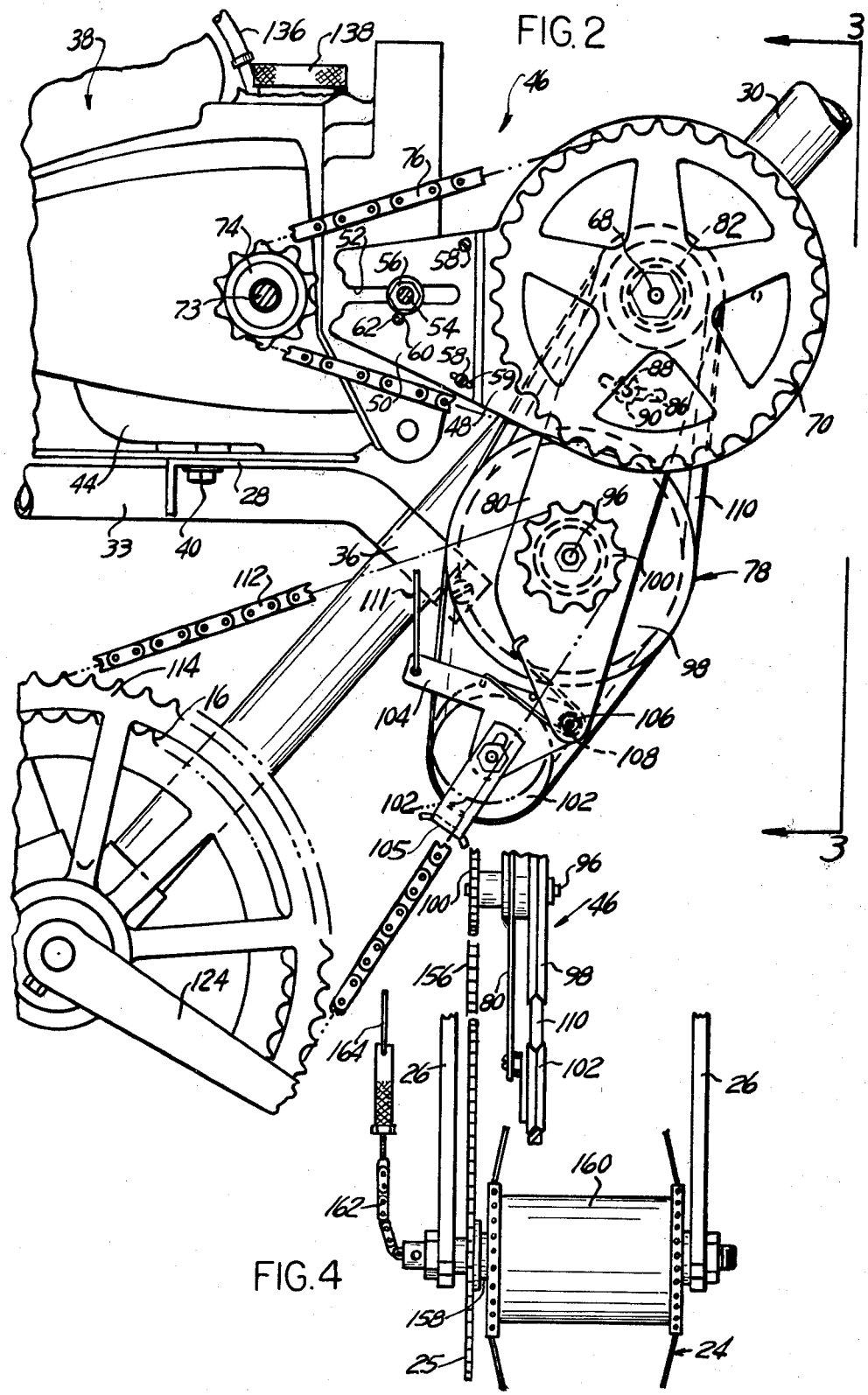
FIG. 2 is a side elevation view of a portion of the auxiliary drive of the invention.
Figure 3:
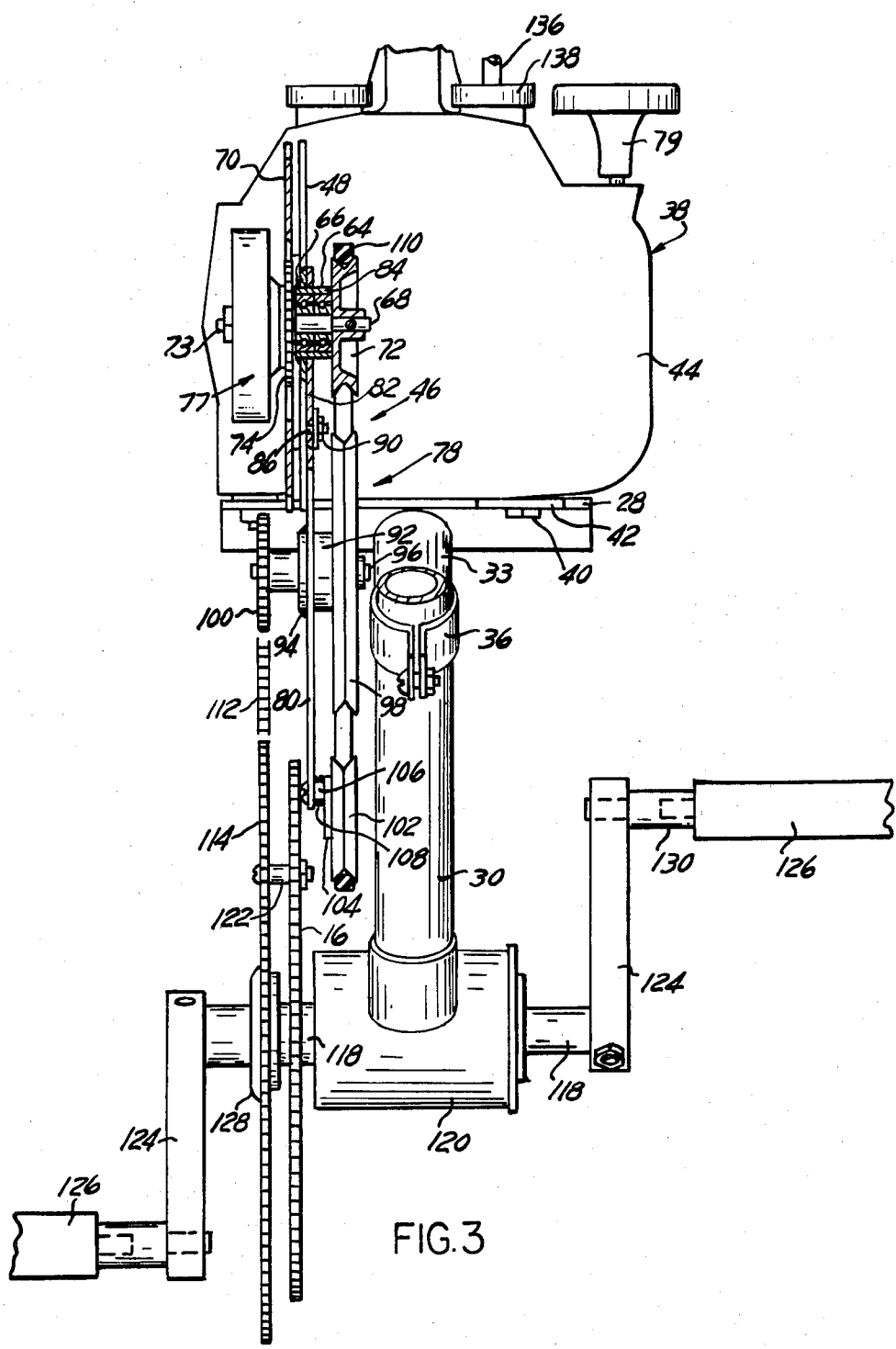
FIG. 3 is a view from line 3—3 of FIG. 2, with portions broken away.

As shown generally at FIG. 1, and in more details at FIGS. 2-3, the structure for driving the rear wheel 14 of a vehicle such as a bicycle 12 comprises a support plate 28 mounted between the front tubing or down tube 30 and the rear tubing or seat tube 32 of a conventional bicycle A-frame by way of a support bar 33, made of preferably tubular material such as bicycle tubing, provided at one end with a clamp 34 for clamping around the seat tube 32, and at the other end with a clamp 36 for clamping around the down tube 30 of the bicycle frame. The invention contemplates utilizing a chain saw motor, as shown at 38, mounted on the support plate 28 by means of mounting bolts or studs 40 passing through mounting apertures 42, in the support plate 28, which are in the form of laterally disposed slots such as to provide a range of lateral adjustment of the housing 44 of the motor 38 for appropriate lateral alignment.

The engine 38 is preferably a conventional chain saw two-cycle single cylinder combustion engine, from which the saw chain and the saw chain bar have been removed and replaced by a drive adapter 46. The drive adapter 46 comprises a mounting plate 48 provided with a mounting lug 50 having a longitudinal slot 52 for adjustable mounting over the usual chain saw bar mounting stud 54, the mounting lug being clamped in position by a washered nut 56. The plate mounting lug 50 is also provided with an aperture 60 accepting therethrough the pin 62 projecting on one side of an adjusting nut, not shown, conventionally used in power chain saw for adjusting the tension of the chain saw, by means of an adjusting screw passed through a channel in the engine housing 44, and displacing the adjusting nut longitudinally for proper tension of the saw chain prior to tightening the chain bar holding nut 56, as is well known in the art. The mounting plate 48 may be made integral with the mounting lug 50 but, preferably, it is adjustably fastened thereto by means of a pair of bolts or screws 58, one of the bolts or screws 58 passing through an arcuate slot 59 in one of the plates.

The drive adapter mounting plate 48 has a bearing 64 pressed in an appropriate aperture at the center of the mounting plate 48 and appropriately fastened such as by welding, as shown at 66 at FIG. 3. The bearing 64 rotatably accepts a stub shaft 68 projecting at both ends of the bearing 64. A relatively large diameter sprocket wheel 70 is keyed on one end of the stub shaft 68, on one side of the mounting plate 48, and a V-groove pulley 72 is keyed on the other end of the stub shaft 68 on the other side of the mounting plate 48. The sprocket wheel 70 is driven from the engine output shaft 73 via a sprocket 74, driven by the output shaft 73, and a link chain 76. The sprocket 74 may be an adapter sprocket mounted on the engine output shaft 73 as a replacement unit for the conventional centrifugal clutch chain saw drive unit or it may be simply the conventional chain drive sprocket forming part of the centrifugal clutch assembly 77 as shown at FIG. 3. When using the chain saw conventional centrifugal clutch assembly 77 mounted on the engine output shaft 73, the governor arm assembly actuating the centrifugal clutch is preferably wedged in an engaged position such that the engine output shaft 73 is positively coupled to the sprocket 74, and can be driven by the sprocket 74 to permit starting of the engine 38 while under way, by engaging a manually operable clutch mechanism 78 and driving the engine 38 for starting without resorting to starting the engine by way of the pull rope start handle 79.

The manually operable clutch mechanism 78 comprises a support plate 80 provided at one end 82 with an aperture 84 accepting therethrough the cylindrical periphery of the bearing 64, the clutch mechanism support plate 80 being pivotably adjustable relative to the drive adapter mounting plate 48, within a range, as a result of being provided with a circular slot 86, FIG. 2, through which is passed the body of a mounting bolt 88, the two plates 48 and 80 being immobilized relative to each other by tightening a nut 90 threading on the end of the mounting bolt 88.

The clutch support plate 80 carries a bearing 92, FIG. 3, pressed in an appropriate aperture and held in position, such as by welding as shown at 94, a stub shaft 96 being journalled in the bearing 92 and carrying on one end a V-belt pulley 98 aligned with the output V-belt pulley 72, and on its other end a relatively small diameter toothed pinion 100. A small diameter V-belt pulley 102 is mounted on one end of an arm member 104, the arm member 104 carrying a belt confining bracket 105 and being pivotally mounted on the end of the clutch mechanism support plate 80 by means of a pivot pin 106, a spiral coil spring 108 being wound around the pivot pin 106 and having the end of one of its legs engaged with the lever arm 104 and the end of its other leg engaged with the plate 80 such as to pivotally bias the lever arm 104 in the direction shown in full lines at FIG. 2. A V-belt 110, wound around a portion of the periphery of the pulley 72 and a portion of the periphery of the pulley 102, engages the large diameter pulley 98 peripherally at two diametrically opposed peripheral areas when the lever 104 is pivoted from the position shown in full lines at FIG. 2 to the position shown in dashed lines, as a result of a pull exerted on the end of the lever arm 104 by a cable 111 having its end attached to the end of the lever arm 104. The other end of the cable 111 is attached to a handle, not shown, mounted on the bicycle handlebar or on a lever, not shown, mounted at an appropriate location on the bicycle frame. A pull on the cable 111 disengages the clutch mechanism 78. The clutch mechanism 78 is normally engaged under the action of the spring 108 tensioning the V-belt 110 such that it engages firmly within the peripheral groove of the pulley 98, with the result that the drive from the engine output shaft 73 is transmitted through the sprocket 74 and the chain 76 to the sprocket wheel 70, thus causing rotation of the pulley 72 which in turn drives the pulley 98 in rotation through the V-belt 110. The toothed pinion 100 is thus driven in rotation via the stub shaft 96, and the toothed pinion 100 through a chain 112 drives a second chainwheel 114 mounted parallel to and interconnected to the bicycle conventional chainwheel 16 mounted on the crank axle 118 generally journalled, as is well known, in the bottom bracket 120 disposed at the bottom of the bicycle seat tube 32 and down tube 30 of the frame. From the chainwheel 16 to the rear wheel 14 of the bicycle, the drive is conventional as for example consisting of the chain 18, the multi-sprocket cluster 20 and the derailleur 22 for changing the ratio by laterally jumping the chain 18 from one sprocket of the cluster 20 to another.

The chainwheels 114 and 16 may consist of the conventional double chainwheel assembly used on 10 or 12-speed bicycles using a double chainwheel and a chainwheel derailleur, with the result that when the engine 38 is driving, through the drive mechanism 46 of the invention, the chainwheel 114, the crank axle 118 is also driven in rotation, causing the cranks 124 and the pedals 126 to be driven as, in conventional bicycle structures, the chainwheel 16 is integral with the right crank 124. As it is desirable to avoid such an inconvenience, the chainwheel 16, coupled to the chainwheel 114 through spacers and bolts 122 is mounted on the crank axle 118 through the intermediary of a one-way ratchet free-wheel 128 (F.F. chainwheel) permitting driving of the crank axle 118 by the cranks 124 and the pedals 126 only when the cranks 124 are actuated in the normal pedalling direction, the multi-sprocket cluster 20 being preferably of the fixed type rather than of the free-wheeling type. After the engine 38 has been started, power drive to the rear wheel 14 is accomplished through all the gear ratios available through the multi-sprocket cluster 20 under the control of the derailleur 22, the rider free-wheeling constantly if so desired.

It will be appreciated that although the engine 38 may be manually started by pulling the rope starter handle 79, with the clutch mechanism 78 disengaged, the available drive between the engine output shaft 73 and the chainwheel 16 permits to start the engine by engaging the clutch mechanism 78 and pedaling the bicycle in the usual manner. To provide improved foot and leg side clearance, the pedals 126 may be mounted each on the end of a crank 124 through an extension stud 130.

The conventional built-in fuel tank of the chain saw engine 38 may be used and, in addition, an auxiliary fuel tank 132, as shown at FIG. 1, may be mounted at a convenient location, preferably below the horizontal or top tube 134 of the bicycle 12 and connected for gravity feed to the chain saw engine built-in fuel tank by a line 136 passing through an appropriate aperture in the built-in fuel tank cap 138.

Appropriate tension of the chain 76 is effected by loosening the nut 56 and adjusting the distance between axes of the chainwheel 70 and of the sprocket 74 by longitudinally moving the drive mounting plate 48, in the same manner as the chain bar of the chain saw is moved for adjusting the tension of the saw chain. The tension of the chain 112 driving the chainwheel 114 from the clutch mechanism output pinion 100 is effected by loosening the nut 90 and rotating the clutch mechanism support plate 80 around its pivot axis provided by the housing of the bearing 64 to an appropriate angular position as allowed by the arcuate slot 86, and tightening the nut 90 after appropriate tension of the chain 112 is effected. If so desired, for aesthetical and safety considerations, the whole drive mechanism 46 may be enclosed by a cover, not shown.

Referring back to FIG. 1, the present invention also contemplates an auxiliary power drive unit 10 for the front wheel 24 of a vehicle such as the bicycle 12. For that purpose, the auxiliary power unit 10 for driving the bicycle front wheel 24 is provided with an internal combustion engine, preferably a chain saw engine 38, mounted on a support plate 140 having a pair of integral bracket members 142 each bolted on the top of the fork crown, as shown at 144. In order to improve rigidity of the engine mount, a generally vertically extending bracket 146 is bolted to the rear end surface of the housing of the engine 38, i.-e. to the bottom of the housing when using a chain saw engine, and the bracket 146 has a bent-over portion 148 clamped to the handlebar post 150 or to the cup of the steering head 151. The handlebar 152 supports an auxiliar fuel tank 154 strapped on the handlebar 152, the fuel tank 154 being mounted above the bracket bent-over portion 148 or, and as illustrated, the fuel tank 154 is a saddle-type fuel tank having a recessed portion at the bottom through which passes the bracket bent-over portion 148.

The power train drive 46 from the engine output shaft 73 to the power train output sprocket 100 is the same as previously described in detail relative to FIGS. 2-3. However, and as shown at FIG. 4, the power train output sprocket 100 drives through a chain 156 the substantially large diameter front wheel sprocket wheel 25 which, in turn, is adapted to drive in rotation the spindle 158 of a conventional three-spaced or five-speed hub 160, provided with its conventional change speed mechanism 162 connected by a cable 164 to a control handle mounted, for example, on the bicycle handlebar 152, FIG. 1. The bicycle front wheel 24 is a conventional bicycle rear wheel provided with a conventional three- or five-speed hub 160. Because three- or five-speed hubs are generally slightly wider than bicycle front wheel hubs, all that is required for mounting the wheel 24 at the bottom of the fork 26 is to spread the fork legs farther away, which is generally within the elastic limit of the tubular material of which the fork is made.

It will be readily apparent that the invention, although providing auxiliary power drive either for the rear wheel or for the front wheel of a bicycle, can also provide for an arrangement, as typically illustrated at FIG. 1, where either of the rear wheel 14 or the front wheel 24 of a bicycle is motor driven, at will, or where both wheels can be driven if so desired, with independent clutch controls for the front and rear wheels. It will further be appreciated that because the invention provides power drive for a steerable bicycle-like wheel as well as for the non-steerable rear wheel of a wheeled vehicle using bicycle elements, such as tricycles and quadricycles, the invention provides a convenient auxiliary power drive unit for tricycles and quadricycles, by supplying motive power to one or more roadwheels.

Chain saw engines, which are the preferred prime mover for the auxiliary power drive of the invention, are very lightweight two-cycle engines running for extended periods of time on a small supply of fuel, such as an appropriate mix of lubricating oil and gasoline. For the application contemplated by the invention, however, chain saw engines present some apparent inconveniences which can be easily overcome. The first inconvenience is that the exhaust from some chain saw engines is relatively noisy, although considerable progress in muffling the exhaust noise of chain saw engines has been accomplished in recent years. For the purpose of the invention, unless a relatively recent chain saw engine with improved muffling of the exhaust sound can be used, the straight-through conventional exhaust stock of older engines may be replaced by a more efficient muffler.

Another apparent inconvenience of chain saw engines is that their throttle control is usually connected to a trigger-like finger control lever mounted below the housing support and carrying handle. It is evident that for incorporation in the invention, the throttle control requires a slight modification consisting in connecting a cable to the carburetor butterfly valve bell crank arm, and the addition of a return to idle throttle control lever or twist grip mounted on the bicycle handlebar. Such a modification, if required, falls within the knowledge of a skilled mechanic and forms no part of the present invention.

Although the invention has been described as an auxiliary power unit using an internal combustion engine as the prime mover, it will be appreciated that other prime movers, such as an electric motor for example, may be used instead of internal combustion engines. However, when an electric motor is used as a prime mover, electrical batteries, preferably rechargeable batteries, are carried on the vehicle. Batteries are costly and heavy and they require considerable space for mounting on any vehicle which, evidently, present problems when using an electric motor as a prime mover for a bicycle. However, using an electric motor as a prime mover on tricycles and quadricycles may be convenient as more space is available on such vehicles for storing the batteries.

It will be readily appreciated by those skilled in the art that although the power train drive of the invention has been described, for illustrative purpose only and not in a limitative sense, mounted on a bicycle for driving one of the roadwheels of the bicycle, the invention is susceptible of modifications and adaptations for delivering motive power to any appropriate utilization mechanism as hereinbefore mentioned. The utilization mechanism may be driven through a chain, such as the chain 112, directly from the output sprocket 100. Alternatively, the output sprocket 100 may be replaced by a pulley for driving a utilization mechanism through a belt, such as a V-belt. As a further alternative arrangement, the sprocket 100 may be replaced by a gear such as to provide a direct gear drive to the utilization mechanism, or a drive through a gear box providing at its output an up-gear ratio or a down-gear ratio drive. By replacing the sprocket 100 by a gear, it may be possible to mount on the plate 80 one or more gear meshing with the output gear replacing the sprocket 100 such as to finally drive a pulley or a sprocket wheel forming the final output driving member of the power train. As a further modification, the output shaft 96 may be used directly for coupling to the drive input of the utilization mechanism.

Having thus described the present invention, modification whereof will be apparent to those skilled in the art, what is claimed as new is as follows:

1. A power drive for coupling a prime mover to a utilization mechanism, said power drive comprising said prime mover having a housing and a power output shaft, a first toothed sprocket mounted on the output shaft of said prime mover, a support plate attached to said housing of said prime mover, a first shaft journaled through said support plate, a chainwheel mounted on one end of said first shaft, a chain driving said chainwheel from said first-toothed sprocket, a first pulley mounted on another end of said first shaft, a second shaft mounted on said support plate, a second pulley mounted on one end of said second shaft, a belt driving said second pulley from said first pulley, means for varying the tension of said belt from a mode whereby said belt is disengaged from at least one of said pulleys to a mode whereby said belt is engaged with both of said pulleys for driving said second pulley by said first pulley, a second toothed sprocket mounted on said second shaft, and chain drive means from said second toothed sprocket to said utilization mechanism.

2. The power drive of claim 1 wherein said belt wraps around a portion of the periphery of said first pulley and around two diametrically opposed portions of said second pulley, and the means varying the tension of said belt comprises a third pulley mounted beyond said second pulley, said belt being wrapped around a portion of the periphery of said third pulley, and means for displacing the axis of said third pulley toward the axis of said second pulley for loosening said belt and away from the axis of said second pulley for tightening said belt.

3. The power drive of claim 2 wherein said prime mover is a chain saw engine assembly, said support plate being substituted for the chain saw bar portion of said chain saw engine assembly.

4. The power drive of claim 2 wherein said utilization mechanism is a vehicle.

5. The power drive of claim 4 wherein said vehicle is a bicycle having a second chainwheel coupled to the conventional chainwheel of said bicycle and said chain drive means from said second toothed sprocket to a roadwheel of said bicycle comprises a chain driving said second chainwheel from said second toothed sprocket, whereby the wheel of said bicycle being driven is the rear wheel of said bicycle driven from said conventional chainwheel through the conventional drive and gearing mechanism of said bicycle.

6. The power drive of claim 5 wherein said prime mover is a chain saw engine assembly said support plate being substituted for the chain saw bar portion of said chain saw engine assembly.

7. The power drive of claim 4 wherein said vehicle is a bicycle and the driven roadwheel of said bicycle is the front wheel of said bicycle, said front wheel having a hub provided with a chainwheel for driving said front wheel, and said chain drive means comprises a chain meshing with said second toothed sprocket and said chainwheel mounted on said front wheel hub.

8. The power drive of claim 7 wherein said prime mover is a chain saw engine assembly, said support plate being substituted for the chain saw bar portion of said chain saw engine assembly.

9. The power drive of claim 4 wherein said prime mover is a chain saw engine assembly, said support plate being substituted for the chain saw bar portion of said chain saw engine assembly.

10. The power drive of claim 1 wherein said prime mover is a chain saw engine assembly, said support plate being substituted for the chain saw bar portion of said chain saw engine assembly.

11. The power drive of claim 1 wherein said utilization mechanism is a vehicle.

12. The power drive of claim 11 wherein said vehicle is a bicycle having a second chainwheel coupled to the conventional chainwheel of said bicycle and said chain drive means from said second toothed sprocket to a roadwheel of said bicycle comprises a chain driving said second chainwheel from said second toothed sprocket, whereby the wheel of said bicycle being driven is the rear wheel of said bicycle driven from said conventional chainwheel through the conventional drive and gearing mechanism of said bicycle.

13. The power drive of claim 12 wherein said prime mover is mounted on a support plate between the seat tube and down tube of said bicycle, said support plate having clamping means for removably attached to said tubes.

14. The power drive of claim 13 wherein said prime mover is a chain saw engine assembly, said support plate being substituted for the chain saw bar portion of said chain saw engine assembly.

15. The power drive of claim 12 wherein said prime mover is a chain saw engine assembly, said support plate being substituted for the chain saw bar portion of said chain saw engine assembly.

16. The power drive of claim 11 wherein said vehicle is a bicycle and the driven roadwheel of said bicycle is the front wheel of said bicycle, said front wheel having a hub provided with a chainwheel for driving said front wheel, and said chain drive means comprises a chain meshing with said second toothed sprocket and said chainwheel mounted on said front wheel hub.

17. The power drive of claim 16 wherein said hub is a conventional bicycle multi-speed hub.

18. The power drive of claim 17 wherein said prime mover is a chain saw engine assembly, said support plate being substituted for the chain saw bar portion of said chain saw engine assembly.

19. The power drive of claim 16 wherein said prime mover is mounted on a support plate removably attached to the front fork of a bicycle.

20. The power drive of claim 19 wherein said prime mover is a chain saw engine assembly, said support plate being substituted for the chain saw bar portion of said chain saw engine assembly.

21. The power drive of claim 16 wherein said prime mover is a chain saw engine assembly, said support plate being substituted for the chain saw par portion of said chain saw engine assembly.

22. The power drive of claim 11 wherein said prime mover is a chain saw engine assembly, said support plate being substituted for the chain saw bar portion of said chain saw engine assembly.

* * * * *